Dec. 3, 1968

W. E. NEWTON 3,414,000

FLOW CONTROL UNIT

Original Filed April 10, 1964

INVENTOR.
WILLIAM E. NEWTON
BY
John H. Crowe
AGENT

Dec. 3, 1968  W. E. NEWTON  3,414,000
FLOW CONTROL UNIT
Original Filed April 10, 1964  4 Sheets-Sheet 4

FIG. 5a.

INVENTOR.
WILLIAM E. NEWTON
BY John H. Crowe
AGENT

United States Patent Office 3,414,000
Patented Dec. 3, 1968

3,414,000
FLOW CONTROL UNIT
William E. Newton, Loma Linda, Calif., assignor to Loma Linda University, Loma Linda, Calif., a corporation of California
Continuation of application Ser. No. 358,838, Apr. 10, 1964. This application Aug. 24, 1966, Ser. No. 574,815
7 Claims. (Cl. 137—209)

ABSTRACT OF THE DISCLOSURE

A unit for selectively regulating the flow of turbine-operating air, syringe air and syringe water to a dental handpiece and having a valve-operating foot plate member rockably supported on a base member. Coacting between these members are a turbine air control valve, situated on a first axis, and syringe air and syringe water control valves, situated on a second axis perpendicular to, and crossing, the first one. The valve-operating member is depressible about its front and side edges to selectively operate one of the valves, or a combination of the turbine air control valve and either one of the syringe valves.

---

This application is a continuation of Ser. No. 358,838 filed Apr. 10, 1964, and now abandoned.

This invention relates generally to fluid flow control devices and, more particularly, to a flow control unit for selectively regulating fluid flow in a plurality of fluid lines.

The present control unit has primary utility in the dental profession, for regulating the flow of operating air, syringe air, and syringe water to a modern high speed dental handpiece. For this reason, the invention will be described in connection with this particular application. It will become evident as the description proceeds, however, that the flow control unit of the invention is susceptible of other applications and, accordingly, should not be regarded as limited in usefulness to the dental profession.

It is well known in the dental profession that the primary causes of the pain and general discomfort experienced by a dental patient during dental drilling are the heat generated by the action of the rotating dental burr or drill on the tooth, the vibrations imparted to the tooth by the burr, and the contact pressure of the burr against the tooth. In recent years, it was determined that such heat generation, vibration, and contact pressure are materially reduced, and the pain and discomfort experienced by a dental patient materially lessened, by increasing the speed of rotation of the burr. It is for this reason that the modern dental handpiece is designed to rotate at an extremely high rate of speed. The normal drilling speed of a modern handpiece, for example, is on the order of 150,000 to 300,000 revolutions per minute.

Speeds of this magnitude are attained in a modern dental handpiece by utilizing a utrbine drive for the shaft of the handpiece. This drive consists of a small turbine wheel which is directly coupled to the shaft and powered by compressed air. In addition to the required turbine-operating air, many handpieces are supplied with compressed air and/or water which is expelled through ports in each handpiece toward the tip of the burr to blow or syringe chips and the like from the tooth area being worked on. The flow of turbine-operating air, syringe air, and syringe water to a dental handpiece of this type is regulated by a floor-mounted flow control unit, or air drive, as it is commonly called, which the dentist may operate by foot pressure to selectively adjust the speed of the dental burr and/or the discharge of syringe air and water from the handpiece.

This invention provides an improved flow control unit for selectively controlling fluid flow in a plurality of fluid lines, which unit is uniquely adapted for use in the dental profession as such an air drive. As noted earlier, and as will become evident from the ensuring description, however, the present control unit is not limited in usefulness to the dental profession and may be employed in other applications requiring selective flow regulation in a plurality of fluid lines. A further aspect of the invention is concerned with a novel valve structure for use in the control unit.

It is a general object of the invention, therefore, to provide an improved flow control unit of the character described for selectively regulating fluid flow in a plurality of fluid lines.

Another object of the invention is to provide an improved flow control unit of the character described which is particularly useful as a dental air drive for regulating the flow of operating air and syringe fluids to a high-speed, turbine-driven dental handpiece.

Yet another object of the invention is to provide an improved flow control unit embodying a unique multiple valve mechanism, wherein selective operation of several flow control valves is simply effected by applying pressure to different points of a single valve-operating lever or foot plate.

A further object of the invention is to provide an improved flow control unit of the character described which is relatively simple in construction, economical to manufacture, compact, pleasing in appearance, and otherwise ideally suited to its intended purposes.

Yet a further object of the invention is to provide an improved valve structure for use in the control unit.

Other objects, advantages, and features of the invention will become readily evident to those skilled in the art as the description proceeds.

Briefly, these objects are attained by providing a flow control unit equipped with a base member, an overlying valve-operating member, and fulcrum means which rockably supports the operating member on the base member in such manner that the operating member is capable of selective rocking motion about either of two crossed, and preferably mutually perpendicular, axes, or about both of these axes simultaneously. Springs act between the members to urge the operating member to a normal, or inoperative, position relative to the base member.

Coacting between these members are a plurality of flow control valves, preferably of the plunger type, each arranged along one rocking axis of the operating member, in spaced relation to the other rocking axis. Each valve is operatively connected between the base and operating members in such manner that rocking motion of the operating member about either axis alone is effective to operate only the valve or valves situated on the other rocking axis. Rocking of the operating member about both axes simultaneously is effective to operate valves situated on both axes.

The illustrated dental flow control unit, or air drive, for example, is equipped with three control valves, to wit, a turbine air control valve, situated along a first rocking axis of the valve-operating member in spaced relation to its second rocking axis, and syringe air and syringe water control valves situated along the second axis at opposite sides of the first axis. In this unit, the valve-operating member is a rectangular foot plate having an exposed front edge which is depressable by the toe of the foot to rotate the plate about its second rocking axis and, thereby, operate the turbine air valve. The foot plate has exposed side edges which are selectively depressable by the toe to rotate the plate in one direction or the other about its first axis and thereby selectively operate the syringe valves. Depressing either intervening edge portion of the plate simultaneously operates the corresponding syringe valve and the turbine air valve.

In this illustrated unit, the foot plate carries the control valves, a syringe water tank, and certain other components, thus creating a structurally simple and compact control unit. The foot plate fulcrum is uniquely designed to avoid valve leakage due to the slight rotation of the plate which occurs as the water tank is emptied. The control valves themselves have certain unique features of construction which extend the valve operating life.

A better understanding of the invention may be had from the following detailed description thereof taken in connection with the annexed drawings, wherein.

The dental flow control unit or air drive 10 illustrated in these drawings comprises a generally rectangular base or floor plate 12 having a downturned floor-engaging rim or flange 14 about its perimeter. The edge of this flange is preferably fitted with a rubber bead or ring 16 to prevent the flange from marring the floor and to resist slippage of the control unit along the floor. Overlying the floor plate 12 is a generally rectangular valve-operating foot plate 18. Plates 12 and 18 are preferably equally dimensioned and oriented with their sides parallel to one another, as shown.

Mounted on the foot plate 18 are three control valves, to wit, a turbine air control valve 20, a syringe air control valve 22, and a syringe water control valve 24. Turbine air valve 20 is situated along a fore-and-aft axis 26 of the plate 18 and the syringe control valves 22 and 24 are situated along a transverse axis 28 of the foot plate, on opposite sides of and approximately equidistant from the axis 26. Turbine air valve 20 is offset rearwardly a distance from the axis 28. Axis 26 is aligned with the longitudinal center line of the foot plate 18. Axis 28 parallels, but is offset a distance to the rear of, the transverse center line of the foot plate. Axes 26, 28, which are shown to be mutually perpendicular, are the rocking axes of the foot plate and will be referred to again later in the description.

Figure 3:
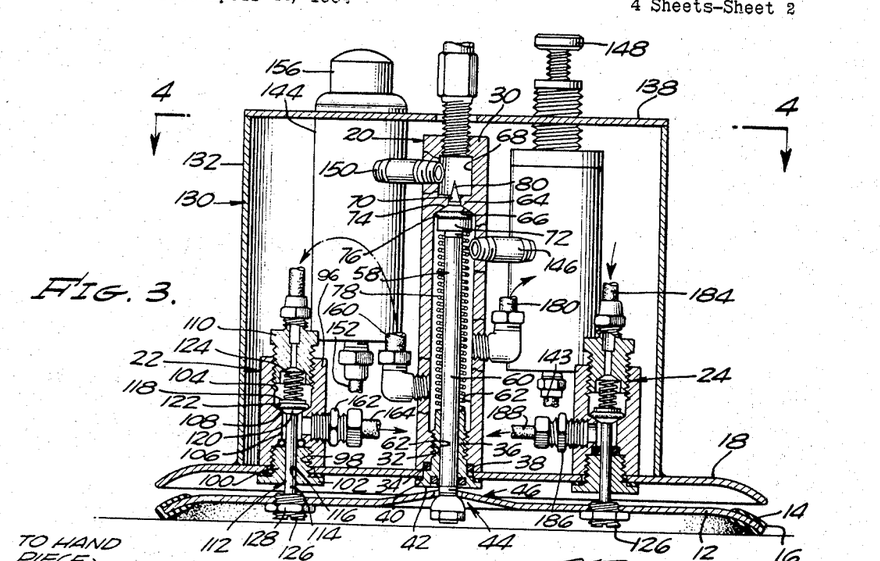
FIGURE 3 is a section taken along line 3—3 of FIGURE 2.
Figures 6, 7:
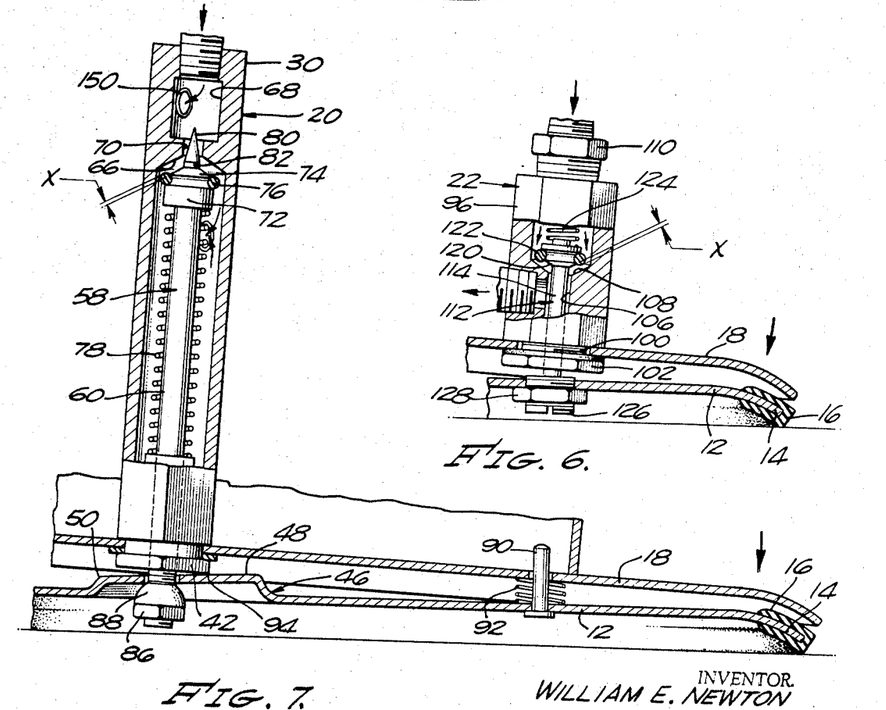
FIGURE 6 is an enlarged section through one syringe valve and a portion of the foot and floor plates of the control unit, illustrating the manner in which the syringe valve is operated by pressure on the foot plate.
FIGURE 7 is an enlarged section through the turbine air control valve and a portion of the foot and floor plates of the unit, illustrating the manner in which the valve is operated by pressure on the foot plate.

Referring to FIGURES 3 and 7, the turbine air valve 20 will be seen to comprise an elongate body 30 disposed in an upright position on the foot plate 18 and seating its lower end against the upper surface of this plate. Extending axially into the lower end of valve body 30 is a threaded bore 32 which is counterbored at its lower end to receive an O-ring 34. The valve body is rigidly secured to the foot plate 18 by a valve stem beaming 36 which projects upwardly through an opening 38 in the foot plate and is threaded in the body bore 32. Bearing 36 is formed with an intermediate shoulder portion 40 having a close fit within the opening 38 and seating against the O-ring 34 to form a fluid-tight seal between the valve body and the bearing. On the lower end of the bearing 36 is a polygonal flange 42 whose major cross-sectional dimension is larger than the diameter of the opening 38, whereby the bearing may be tightened to firmly clamp the foot plate between the bearing flange and the valve body, thereby to firmly secure the latter to the foot plate.

Figure 5:
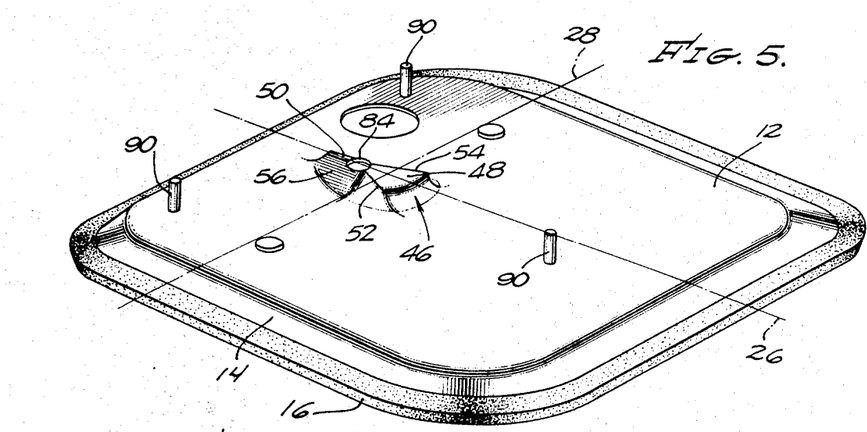
FIGURE 5 is a perspective view of the base member, or floor plate, of the illustrated flow control unit.
Figure 5A:
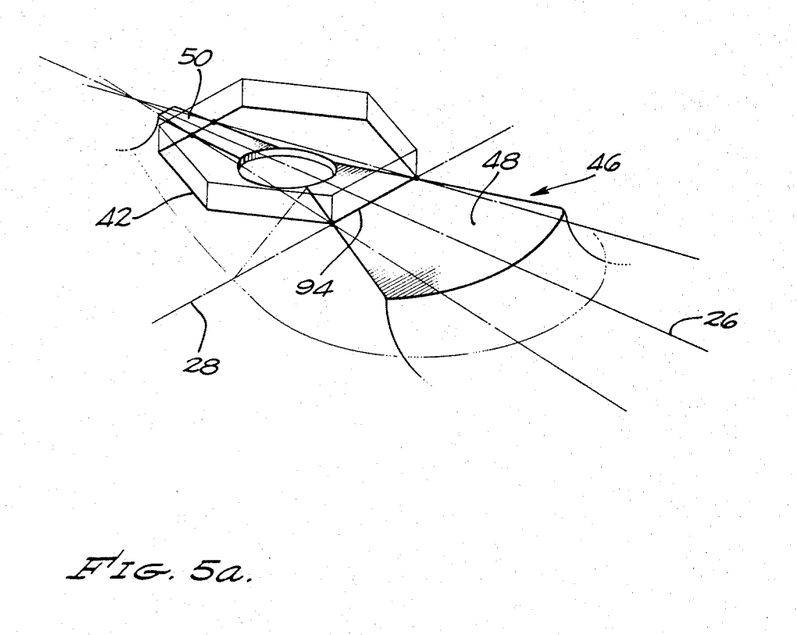
FIGURE 5a is a perspective view of the fulcrum means for rockably supporting the foot plate of the air drive.

Foot plate 18 is rockably supported on the floor plate 12, for rocking motion about the two mutually perpendicular axes 26 and 28 mentioned earlier, by fulcrum means 44. Fulcrum means 44 are formed, in part, by the lower flange 42 of the valve stem bearing 36 and, in part, by a fulcrum formation 46 embossed in and upstanding from the floor plate 12. Formation 46 is generally triangular in outline and is symmetrical about the fore-and-aft rocking axis 26. As may be best observed in FIGURE 5, fulcrum formation 46 provides a raised, generally triangular anterior surface 48 which is bisected by the fore-and-aft rocking axis 26, and a posterior ridge or edge 50 which lies on the latter axis. Surface 48 and edge 50 are disposed in a common plane which slopes downwardly toward, and at a small acute angle to, the plane of the floor plate toward the rear edge of the latter plate. Surface 48 is bounded by opposing side edges 52 and 54 which diverge toward the front edge of the foot plate and, when extended, approximately intersect the two forward corners of the plate. The side walls 56 of the fulcrum formation 46 slope downwardly from the anterior surface 48 and the posterior ridge 50 toward the floor plate 12 at an angle on the order of 20 degrees. The lower flange 42 of the valve stem bearing 36 seats against, and is rockably supported by, the formation 46 in the manner illustrated in the drawings and to be described in detail shortly.

Turbine air control valve 20 includes a valve plunger 58 having a stem 60 which is slidably guided in a bore 62 through the valve stem bearing 36. The upper end of this valve stem extends axially through an enlarged chamber 60 within the valve body 30, above the bearing 36. Within the upper end of the valve body 30 is an internal annular shoulder 64, the upper surface of which is conically tapered to form a downwardly presented conical valve seat 66. Extending through this shoulder, and communicating the lower valve chamber 62 with an upper chamber 68 in the valve body 30, is a restricted orifice 70. Valve stem 60 has threaded on the upper end thereof an enlarged cylindrical valve core 72 which is somewhat smaller in diameter than the internal diameter of the lower valve chamber 62, thereby to provide an annular flow space between the inner wall of the latter chamber and the valve core. The upper face 74 of this valve core is conically tapered at the same angle as the conical valve seat 66. Formed in the valve core 72, at the base of its conically tapered valve face 74, is a circumferential groove containing an O-ring 76. As may be best observed in FIGURE 7, the depth of the O-ring groove is such that the O-ring 76 projects a distance x beyond the conically tapered valve face 74.

This construction of the valve 20 constitutes one important feature of the present invention and is unique and highly desirable for the following reasons: During upward movement of the valve plunger 58 in valve body 30, from the valve-open position of FIGURE 7 to the valve-closed position of FIGURE 3, the plunger reaches a position in which the O-ring 76 initially contacts the conical valve seat 66 on the valve body. During the subsequent terminal closing movement of the valve plunger to its closed position of FIGURE 3, the O-ring 76 is compressed between the valve seat 66 and the valve core 72, thereby to form an efficient fluid-tight seal between these parts. Eventually, the conical valve face 74 bottoms against the valve seat 66. This contact of the valve face with the valve seat serves a two-fold purpose. First, contact of the valve face with the valve seat provides a secondary fluid seal between the valve core and the valve body. Secondly, contact of the valve face with the valve seat furnishes a positive stop for the valve plunger which limits compression of the O-ring 76, thereby prolonging the operating life of the ring. Valve plunger 58 is normally retained in this closed position by a coil compression spring 78 which acts between the valve stem bearing 36 and the valve core 72.

Valve plunger 58 is designed to provide a flow metering function in addition to its flow-shutoff function just described. To this end, the valve core 72 is formed with a conical metering pintle 80 which projects axially through the valve seat orifice 70. During opening and closing movement of the valve plunger 58 in the valve body 30, this metering pintle moves axially in the orifice 70 to progressively vary the effective flow area of the orifice and, thereby, progressively regulate fluid flow through the orifice. The base of the pintle is preferably cylindrically shaped, as at 82, and proportioned to have a close sliding fit within the orifice. This pintle structure serves a twofold purpose. First, the cylindrical pintle portion 82 is so axially dimensioned that during closing movement of the plunger 58, the cylindrical portion enters the orifice 70 just prior to initial seating of the O-ring 76 against the valve seat 66. During opening movement of the plunger, therefore, the cylindrical pintle portion is retracted from the orifice after unseating of the O-ring from the valve seat. In this way, flow through the valve is effectively cut off during seating and unseating of the O-ring 76, with the result that there is little, if any, tendency for the ring to be displaced from its groove. The cylindrical pintle portion 82 serves a secondary function in that it acts to center the valve core 72 relative to the valve seat 66 during final closing movement of the valve plunger 58.

The lower end of the valve stem 60 projects from the lower end of the valve stem bearing 36 and through a slightly enlarged opening 84 in the fulcrum formation 46. Opening 84 is located on the fore-and-aft rocking axis 26, at the posterior or apex end of the triangular surface 48 of the formation. Threaded on the valve stem 60, below the floor plate 12, is a nut 86 having a generally semi-spherical upper bearing surface 88 seating against the under surface of the formation 46, about the opening 84. It is evident, therefore, that the valve plunger 60 operatively connects the floor plate and the foot plate in such manner that the latter is capable of rocking motion relative to the floor plate. The valve spring 78 urges the bearing flange 42 into seating engagement with the fulcrum formation 46.

Press-fitted into the floor plate 12 are three locating pins 90 which project above the upper surface of the plate and through slightly enlarged openings in the foot plate 18. These pins serve to loosely locate the foot plate relative to the floor plate with the plate edges aligned, as illustrated in the drawings. One locating pin 90 is located on the fore-and-aft rocking axis 26, approximately midway between the fulcrum formation 46 and the front edge of the floor plate. The remaining two locating pins are aligned laterally of the floor plate and are located equal distances to opposite sides of the axis 26 and adjacent the rear edge of the floor plate, whereby the three locating pins are located approximately at the apices of an equilateral triangle. Locating pins 90 are encircled by coil springs 92 which act between the floor plate 12 and the foot plate 18 to normally urge the latter to its normal or inoperative position of FIGURES 2 and 3. In this position, the foot plate approximately parallels the floor plate. Nut 86 on the plunger 58 of turbine air valve 20 is adjusted so that in this normal position of the foot plate, the plunger occupies its closed position of FIGURE 3, and the bearing surface 88 on the nut seats against or is spaced slightly from the under surface of the fulcrum formation 46.

Figures 1, 2:
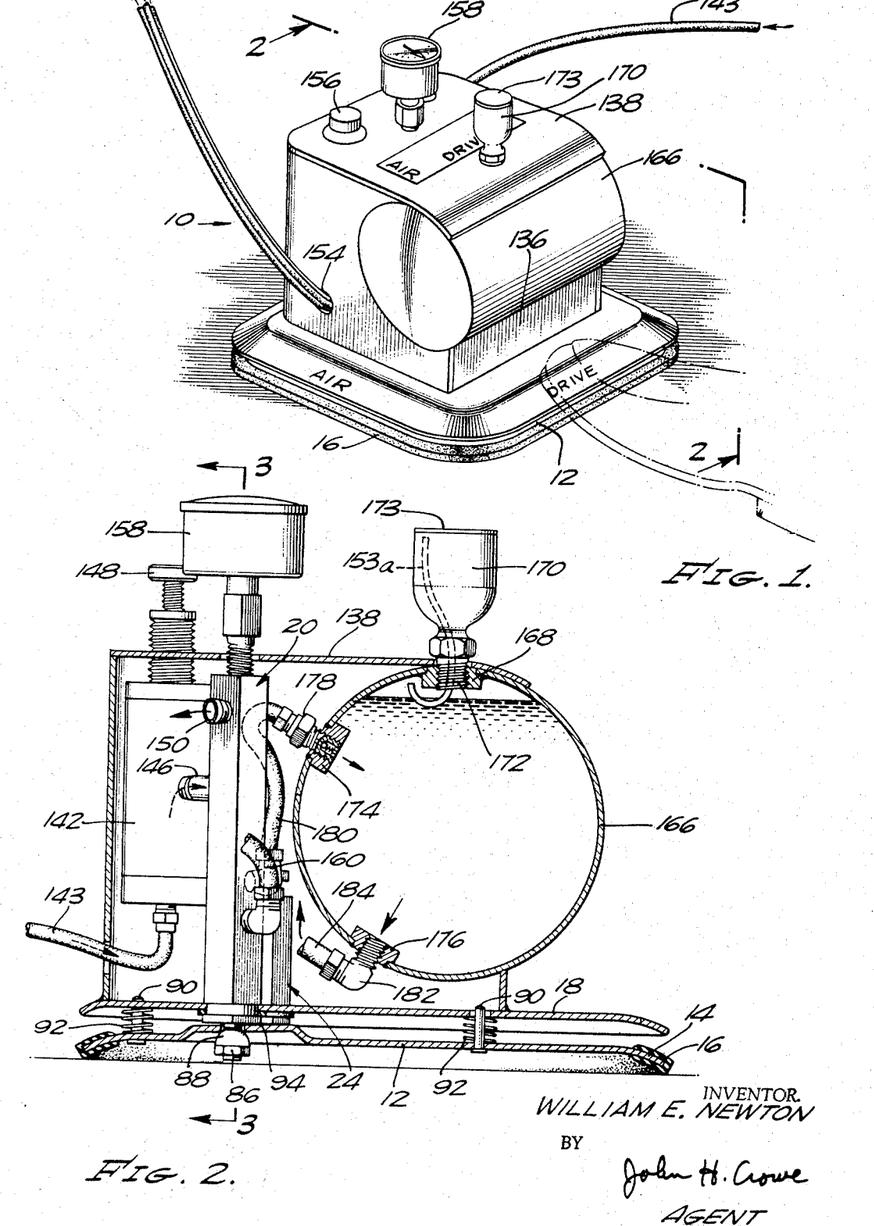
FIGURE 1 is a perspective view of a dental flow control unit, or air drive, according to the invention.
FIGURE 2 is an enlarged section taken along line 2—2 in FIGURE 1.
Figure 4:
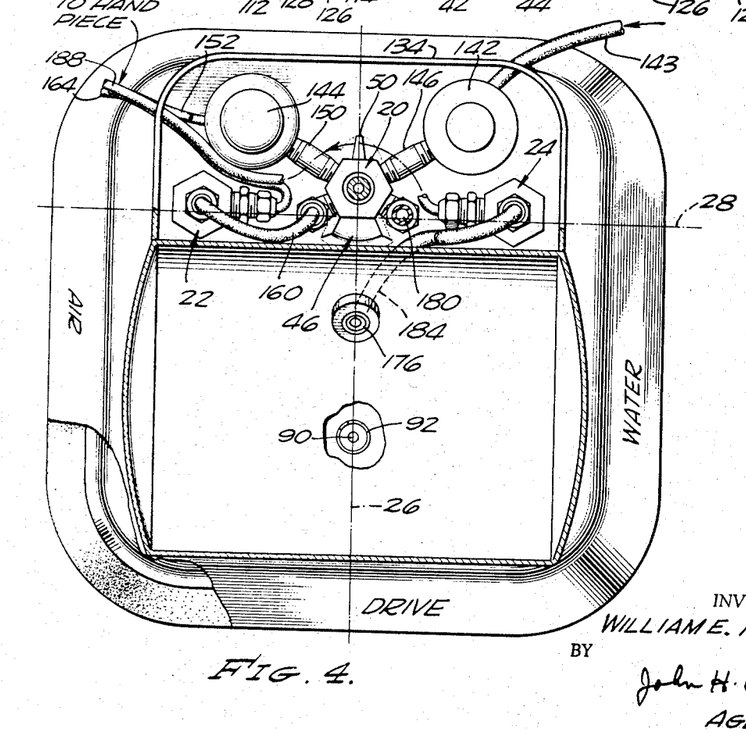
FIGURE 4 is a section taken along line 4—4 in FIGURE 3.

As shown best in FIGURE 4, the lower flange 42 on the valve stem bearing 36 of turbine air valve 20 is hexagonal in shape and is oriented with one of its sides facing forwardly and extending normal to the fore-and-aft center line of the fulcrum formation 46. Referring to FIGURE 2, it will be observed that this forwardly facing side of the flange has a lower edge 94 which rests on the upper, anterior surface 48 of the fulcrum formation. In this normal position of the foot plate, a small spacing exists between the posterior rib or edge 50 of the formation and the under surface of the bearing flange 42 because of the rearward slope of the formation.

At this point, it is evident that if the forward edge of the foot plate 18 is depressed from its normal position of FIGURE 2, the plate is rocked in a clockwise direction (as viewed in FIGURE 2) about the forward edge 94 of the bearing flange 42, thereby compressing the forwardly located foot plate spring 92 and relieving the load on the two rearwardly located foot plate springs. When the downward pressure on the forward edge of the foot plate is removed, the forward compressed spring 92 returns the plate to its normal position, thereby rocking the plate in a counterclockwise direction about the flange edge 94. Thus, this edge forms a fulcrum for the foot plate 18, and the anterior surface 48 of the fulcrum formation 46 a bearing surface for the fulcrum. Fulcrum 94 and its bearing surface 48 coact to rockably support the foot plate 18 for rocking motion about an axis containing the edge 94. This is the rocking axis designated by the numeral 28 in FIGURE 4.

Because the longitudinal axis of the turbine air control valve 20 is located a distance rearwardly of the rocking axis 28, it is evident that the clockwise rocking motion imparted to the foot plate by depression of its forward edge raises the valve body 30 relative to the valve plunger 58, thereby unseating the valve core 72 from the valve seat 66 and compressing the valve spring 78. When the pressure on the front edge of the plate is relieved, to permit return of the foot plate to its normal position, the valve body 30 is lowered relative to the valve plunger 58 to reseat the valve core 72 on the valve seat 66. Compressed valve spring 78 obviously aids the forward foot plate spring 92 in thus returning the foot plate to its normal position.

It is evident, therefore, that depression of the front edge of the foot plate 18 is effective to open the turbine air valve 20 and that release of the foot plate is effective to restore the valve to its normal closed position. It is assumed here that the force which depresses the foot plate is applied to the edge of the plate on, or close to, its fore-and-aft center line, that is, close to the rocking aixs 26. The reason for this is that the valve spring 78 and the three foot plate springs 92 produce a resultant spring force on the foot plate which obviously acts along a direction line intersecting the latter rocking axis. Accordingly, when the foot plate is depressed by applying a force to the edge of the plate on, or close to, the axis 26, the applied force, the resultant spring force, and the fulcrum means 44 are approximately aligned in the fore-and-aft direction of the foot plate, whereby no unbalanced moment exists on the plate about its fore-and-aft rocking axis 26. Under these conditions, then, the foot plate rocks solely on its fulcrum edge 94 and about axis 28 to operate the turbine air valve 20.

Assume now that the foot plate is depressed by applying a force to its front edge at a position offset a substantial distance to either side of the fore-and-aft rocking axis 26. Here, again, of course, the plate is rocked on its fulcrum edge 94, about the axis 28, to open the turbine air valve 20 in the manner explained above. In this case, however, the applied force is offset laterally of the foot plate with respect to the resultant of the spring forces on the plate and its fulcrum means 44. Accordingly, an unbalanced moment is produced on the foot plate, about its axis 26, which produces lateral rocking motion of the plate. During this lateral rocking motion, the fulcrum edge 94 of the foot plate pivots about that boundary edge 52 or 54 of the fulcrum formation surface 48 which lies on the same side of the fore-and-aft rocking axis 26 as the applied force. Thus, when the foot plate is depressed by applying a force to the front edge of the plate a distance to either side of its fore-and-aft center line, the plate undergoes a compound fore-and-aft and lateral rocking motion involving pivoting of the plate on the edge 94 as a fulcrum, and about the axis 28, and simultaneous pivoting of the edge 94 on one of the edges 52 or 54 as a fulcrum, and substantially about the axis 26.

Assume now that the point of application of the force on the foot plate is progressively shifted along the front edge of the plate toward and around the adjacent corner of the plate and then along the adjacent side edge of the plate toward the axis 28. It is apparent that at the point of application of the applied force recedes from the fore-and-aft rocking axis 26, the rocking moment on the plate about the latter axis progressively increases, and as the point of application approaches the transverse rocking axis 28, the rocking moment on the plate about the latter axis progressively diminishes. Thus, as the point of application of the applied force is shifted along the edge of the foot plate in the manner just mentioned, a given pressure on the plate produces progressively less displacement of the plate about the axis 28, and, thereby, less opening of the turbine air valve 20, and progressively greater displacement of the plate about the axis 26.

Let us assume next that the force for depressing the foot plate 18 is exerted on the edge of the plate at a position slightly to the rear of axis 28. In this case, there is produced on the plate 18 a counterclockwise (as viewed in FIGURE 2) moment about the axis 28 which rocks the foot plate in a counterclockwise direction on its fulcrum edge 94. This rocking motion of the plate rotates the under surface of the valve stem bearing flange 42 downwardly into contact with the posterior rib 50 of the fulcrum formation 46 and thereby, moves the valve stem nut 86 downwardly out of contact with the under surface of the formation. The turbine air control valve 20 is then capable of limited lateral rocking motion with the foot plate 18 without creating relative opening movement of the valve body 30 and valve plunger 58. Depressing the foot plate 18 in the manner just described, of course, causes such lateral rocking motion of the foot plate and valve body. During this lateral rocking motion, the under surface of flange 42 pivots about fulcrum formation boundary edge 52 or 54, depending upon which side of the foot plate is depressed, and the posterior rib 50 of the fulcrum formation. It is apparent, therefore, that the actual rocking axis of the foot plate passes through the points of engagement of the flange 42 with rib 50 and fulcrum edge 52 or 54, as the case may be, and that this actual rocking axis deviates slightly to one side of the axis 26 shown in FIGURE 4. However, when the opposite side edge of the foot plate 18 is similarly depressed, the actual rocking axis of the plate deviates equally to the opposite side of the axis 26 so that the latter axis represents the effective lateral rocking axis of the foot plate.

It is considered to be within the scope of this invention to provide the present flow control unit with a single flow control valve, such as the turbine air control valve 20. In this case, depression of the foot plate 18 at different positions along its edge would serve merely to vary the valve opening. The illustrated flow control unit, or dental air drive, however, is equipped with two additional valves, to wit, the syringe air control valve 22 and the syringe water control valve 24, which are operated by lateral rocking motion of the foot plate 18. Valves 22 and 24 are identical, so that only the syringe air control valve 22 will be described in detail. Valve 22 includes a valve body 96 having a threaded bore 98 extending axially into its lower end. Theaded in the bore 98 is a valve stem guide 100 which projects upwardly through an opening in the foot plate 18 and has a flange 102 below the foot plate. Guide 100 is tightly threaded into the valve body 96, thereby to firmly clamp foot plate 18 between the flange 102 and the valve body and rigidly secure the latter in an upstanding position on the foot plate. Extending axially through the valve body 96, from the threaded bore 98 to a chamber 104 in the upper end of the valve body, is a reduced bore 106. The upwardly presented shoulder surface about the upper end of the bore 106 is conically tapered to form a valve seat 108. The upper end of the valve chamber 104 is threaded to receive a nipple 110.

Within the valve body 96 is a valve plunger 112 including a valve stem 114 which extends through the bore 106 and is slidably guided in a bore 116 extending through the valve stem bearing 100. On the upper end of the valve stem 114 is a valve core 118 having a downwardly presented conical face 120 confronting and disposed at the same angle as the valve seat 108. Valve core 118 has a circumferential groove at the upper end of the conical face 120 containing an O-ring 122. O-ring 122 projects beyond the conical valve face 120 a distance $x$ (FIGURE 6) in the same manner as the O-ring in the turbine air control valve 20. Thus, during downward closing movement of the valve plunger 112 in the valve body 96, the O-ring 122 initially contacts the valve seat 108. The O-ring is compressed between the valve seat and the valve core during terminal closing movement of the plunger to its closed position of FIGURE 3 in which the valve face 120 engages the valve seat 108. This structure of the syringe air control valve, therefore, possesses the same advantages as the corresponding structure of the turbine air control valve. Acting between the lower end of the nipple 110 and the upper face of the valve core 118 is a coil spring 124 which normally urges the valve plunger 112 to its closed position.

The lower end of the valve stem 114 projects below the valve stem bearing 100. Threaded in the floor plate 12, in axial alignment with the valve stem 114, is a set screw 126 on which is threaded a lock nut 128 for retaining the set screw in adjusted position relative to the floor plate.

As noted earlier, the syringe water control valve 24 is identical to the syring air control valve 22, just described. A second set screw 126, having a lock nut 128, is threaded in the floor plate 12 in line with the valve stem 114 of valve 24. Set screws 126 are adjusted so that when the foot plate 18 occupies its normal position of FIGURES 2 and 3, the plungers 112 of valves 22 and 24 occupy their normal closed positions, with the lower ends of the valve stems 114 of the latter valves resting lightly against, or just slightly spaced form, the set screws. As noted earlier, the syringe air and water control valves 22 and 24 are located approximately equal distances to opposite sides of the foot plate rocking axis 26, and approximately along, or preferably slightly to the rear of the rocking axis 28.

It is apparent from the earlier description of the foot plate fulcrum means 44 and the foregoing description of the syringe air and water control valves that when the front edge of the foot plate is depressed in a position along or close to the axis 26, to rock the foot plate about the axis 28, the body 30 of the turbine air control valve 20 is raised to open this valve. Since the syringe control valves are offset slightly to the rear of axis 28, these valves are also raised slightly during depression of the front edge of the foot plate. However, it is obvious that such elevation of the syringe control valves simply raises the valve stems 114 upwardly away from the set screws 126, thereby leaving the valves in their closed positions. All three valves 20, 22 and 24, of course, tilt or rock with the foot plate.

Assume now that the point of application of the force for depressing the foot plate 18 is progressively shifted along the edge of the plate, in the manner described earlier, thereby to impart a component of lateral rocking motion to the foot plate about its effective rocking axis 26. It is apparent that this lateral rocking action of the foot plate lowers one of the syringe control valves 22 or 24, depending upon the direction of such rocking motion, thereby forcing the valve stem 114 of the lowered valve against the underlying set screw to open the valve. Accordingly, one syringe valve and the turbine air control valve are open simultaneously. As the point of application of the applied force on foot plate 18 approaches the rocking axis 28 of the plate, the turbine air control valve opening is progressively reduced and the respective syringe valve opening is progressively increased. Depression of the foot plate at a position to the rear of the axis 28 effects opening of the corresponding syringe valve only, the turbine air control valve then remaining in its closed position, as described earlier. It is obvious, of course, that depression of the left-hand edge of the foot plate 18, as the latter is viewed in FIGURE 4, opens the syringe air control valve 22 and depression of the right-hand edge of the foot plate opens the syringe water control valve 24.

At this point, then, it is evident that either syringe valve 22 or 24 may be operated by itself, or in combination with the turbine air control valve 20, and that the latter valve may be operated by itself, and further that the respective valve openings may be progressively regulated, by selectively depressing the foot plate 18 at different positions along its front and side edges. The syringe valve springs 124, of course, produce additional spring forces on the foot plate 18 which aid in restoring the latter to its normal position. Since the syringe valves are symmetrically located with respect to the rocking axis 26 of the foot plate, the resultant of the several spring forces on the plate intersects the latter axis, whereby the earlier description of the rocking action of the foot plate applies in the case of three valves, as well as in the case of one valve.

Valves 20, 22 and 24 are enclosed in a housing structure 130 attached to the foot plate 18 and including side walls 132, a rear wall 134, a front wall 136, and a top wall or cover 138. The cover may be removed to permit access to the interior of the housing. Within the housing 130 are an air filter and pressure regulator 142 and an oiler 144. High pressure air from a supply (not shown) is delivered to the bottom of the regulator 142 through a hose 143. Leading from the outlet of the regulator to the body 30 of turbine air control valve 20 is a conduit 146 which communicates the regulator outlet to the valve chamber 62. Regulator 142 is conventional and includes a pressure regulating screw 148 which projects through an opening in the cover 138 to permit adjustment of the outlet pressure of the regulator. Leading from the upper end of turbine air valve body 30 to the inlet of the oiler 144 is a conduit 150 which communicates the upper valve chamber 68 to the oiler inlet. A hose 152 extends from an outlet in the lower end of the oiler to the exterior of the housing 130 through an opening 154 in one side wall 132 of the housing. The outer end of hose 152 is connected to the turbine air inlet of the dental handpiece (not shown). Regulator 142 and oiler 144 are supported on the turbine air valve 30 by means of the conduits 146 and 150, respectively.

Accordingly, when the turbine air control valve 20 is opened by depression of the foot plate 18, the air delivered to the unit through hose 144' flows through pressure regulator 142, valve 20, and oiler 144 to the dental handpiece to power its turbine. The air is filtered and its pressure is regulated as it passes through the regulator 142. Oiler 144 injects an oil mist into the air stream as the latter flows through the oiler on its way to the handpiece. The upper end of the oiler 144 projects through an opening in the cover 138 and mounts a transparent cover 156 through which the operation of the oiler may be observed. Some units may have an air return line from the turbine exhaust and an oil collector for removing the oil from the exhaust air. The return line and oil collector are not shown, however. The metering pintle 80 on the turbine air control valve plunger 58 permits the air flow to the handpiece and, thereby, the speed of the handpiece to be controlled by adjustably depressing the foot plate. If desired, a pressure gauge 158 may be threaded into the upper end of the turbine air control valve 20 to indicate the air pressure delivered to the dental handpiece.

Extending between the body 30 of turbine air control valve 20 and the nipple 110 on the upper end of the syringe air valve 22 is a conduit 160 which communicates the turbine air valve chamber 62 to the upper bore or chamber 104 in the syringe air valve. Threaded in a bore located in the side wall of, and opening to the bore 106 within, the body 96 of syringe air valve 22 is a coupling 162 to which is fixed one end of a hose 164. Hose 164 extends through the housing side wall openings 154 to the syringe air inlet of the dental handpiece. It is evident, therefore, the air is constantly supplied to the syringe air valve 22, above its plunger 112, from the pressure regulator 142 and that when this air valve is opened by depression of the foot plate 18 in the manner described earlier, air flows through the valve to the syringe air port on the dental handpiece.

Fitted at its ends in generally circular cutouts in the housing side walls 132 is a cylindrical water tank 166. The upper edge of the front wall 136 of the housing is located some distance below the housing cover 138 to define therebetween an opening through which the side wall of the water tank protrudes. The front edge portion of the cover 138 rests on and curves around the top of the water tank, as shown. Welded or otherwise fixed to the inner wall of the tank 166 is a boss 168 having a threaded bore opening to the interior of the tank. Located above the cover 138 is a funnel 170 having a lower stem 172 which extends through an opening in the cover and is threaded in the boss 168. Threaded in the top of the funnel 170 is a cover 173 which may be removed to permit tank 166 to be filled with water through the funnel. Within the funnel is a vent 153a, preferably a small plastic tube, which opens to the top of the tank to vent the latter during filling.

Within the tank 166 are two additional bosses 174 and 176 which are welded or otherwise rigidly joined to the rear side wall of the tank. Extending between the body 30 of turbine air control valve 20 and a coupling 178 threaded in the upper tank boss 174 is a conduit 180 which communicates the lower chamber 62 of the turbine air valve to the interior of tank 166. The interior of the tank is thus constantly pressurized by air from the pressure regulator 142. Extending from a coupling 182 threaded in the lower tank boss 176 to the upper nipple 110 of the syringe water valve 24 is a conduit 184 which communicates the interior of tank 166 to the upper bore or chamber 104 in the syringe water valve. The syringe water valve, like the syringe air valve, has a hose coupling 186 threaded in the side wall of its valve body 96 and opening to the lower bore or chamber 106 in the body. Secured at one end to this coupling is a hose 188 which extends through the side wall opening 154 in housing 130 to the syringe water inlet of the dental handpiece. It is apparent, therefore, that when the syringe water valve 24 is opened by depression of the foot plate 18, in the manner explained earlier, water is expelled from the tank 166 by the air pressure therein and flows through valve 24 and hose 188 to the syringe water port on the dental handpiece.

In use, the illustrated flow control unit, or dental air drive, 10 is placed on the floor in a position wherein the dentist may conveniently depress the edge of the foot plate 18 with the toe of his foot. Depression of the front edge of the foot plate, at a position on or close to the effective rocking axis 26 of the plate, opens only the turbine air valve 20, thereby supplying pressure air to the turbine of the dental handpiece. The pressure of air delivered to the handpiece, and thereby the shaft speed of the handpiece, may be regulated by adjusting the pressure of the toe against the edge of the foot plate. If the left-hand edge of the foot plate, in FIGURE 4, is depressed approximately on or slightly to the rear of the transverse rocking axis 28 of the plate, only the syringe air valve 22 is opened, to deliver syringe air to the handpiece. Similarly, depression of the right-hand edge of the foot plate, at a position approximately on or slightly to the rear of the axis 28, opens only the syringe water valve 24, to deliver syringe water to the handpiece. Finally, depression of the foot plate between these positions opens the turbine air valve and either the syringe air valve or the syringe water valve, depending upon which side of the axis 26 the plate is depressed. The relative openings of the turbine air valve and the syringe valve are varied by depressing the foot plate at various positions along its front and side edges.

The several spring forces active on the foot plate 18 are selected to retain the foot plate in its normal position of FIGURES 2 and 3, parallel to the floor plate, when the tank 166 is full of water. Accordingly, as the tank weight diminishes during use, due to consumption of the water, the foot plate springs tend to rotate the foot plate slightly in the counterclockwise direction, as viewed in FIGURE 2, about the fulcrum edge 94. It is apparent that if the lower face of the valve stem guide flange 42 of turbine air control valve 20 seated flat against the upper surface of the fulcrum formation 46 when the foot plate occupied its normal or inoperative position, counterclockwise rotation of the foot plate due to the reduction in weight of tank 166 would tend, undesirably, to open the turbine air valve in much the same way as clockwise rocking motion of the plate opens the valve. Such undesirable opening of the turbine air valve is avoided by sloping the upper surface of the fulcrum formation, as explained earlier and illustrated in the drawings, so that the foot plate is permitted to undergo limited counterclockwise rotation about the fulcrum edge 94, as the tank weight lessens, without causing relative axial movement between the turbine air valve body 30 and its valve plunger 58.

It is also apparent that rotation of the foot plate 18, due to the reduction in the weight of tank 166, lowers the syringe valves 22 and 24 toward the floor plate 12 and would cause inadvertent opening of these valves if their valve stems 114 initially rested firmly on the respective set screws 126. Such inadvertent opening of the syringe valves may be avoided either by spacing the valve stems 114 from their respective set screws 126, or by locating the valves on, or substantially on, the axis 28. It is for this reason that the syringe valves in the illustrated flow control unit, or dental air drive, are located approximately on the axis 28. However, to insure that depression of the front edge of the foot plate, to rock the latter about the axis 28 only, will not cause inadvertent opening of the syringe valves, the latter are offset a slight distance to the rear of the axis 28, as mentioned earlier. Accordingly, the lower ends of the plunger stems 114 of these valves are preferably slightly spaced from their set screws 126 when the foot plate 18 occupies its normal position.

The present air drive may be used both in an office or laboratory which is equipped with its own high pressure air supply as well as in the field and other places where there is no air supply. In such field use, for example, the air drive may be powered by bottled gas, such as carbon dioxide.

Clearly, therefore, the flow control unit specifically disclosed herein is fully capable of attaining the several objects and advantages preliminarily set forth. In view of what was said earlier, it will be understood that the terms "turbine air valve," "syringe air valve," and "syringe water valve" are intended to be merely descriptive of the illustrative embodiment of the invention, since it is now obvious that the control unit may be used for other than the purpose described, and the individual valves may be used to control fluids other than air and water.

Various modifications in the design, arrangement of parts and instrumentalities of the invention are also possible, of course, within the spirit and scope of the following claims.

I claim:
1. A dental air drive comprising:
a floor plate;
a foot plate overlying said floor plate;
fulcrum means rockably supporting said foot plate on said floor plate for selective rocking of said foot plate about either of two normally horizontal axes or rocking of the foot plate about both axes simultaneously;
springs acting between said plates for urging said foot plate to a normal position relative to said floor plate;
a first valve including an upstanding valve body fixed to said foot plate along one of said axes in offset relation to the other axis and a valve plunger axially movable in said valve body and operatively engaging said floor plate so that said valve is operated by rocking motion of said foot plate about said other axis;
a second valve including an upstanding valve body fixed to said foot plate along the other axis in offset relation to said one axis and a valve plunger axially movable in said latter valve body and having its lower end operatively engaging said floor plate so that said second valve is operated by rocking motion of said foot plate about said one axis;
means for supplying compressed air to the inlet of said first valve;
means for supplying a syringe fluid to the inlet of said second valve; and
flexible hoses connected to the outlets of said valves, respectively, and adapted for connection to the turbine air inlet and a syringe fluid inlet of a dental handpiece, whereby said first valve is opened to supply operating air to said handpiece by depression of the edge of said foot plate at a position approximately along said one axis and said second valve is opened to supply syringe fluid to said handpiece by depression of the edge of said foot plate at a position approximately along said second axis, and said valves are opened simultaneously to supply both air and syringe fluid to said handpiece by depression of the edge of said foot plate between said positions.

2. An air drive according to claim 1, including:
a third valve including an upright valve body fixed to said foot plate approximately along said second axis and at the opposite side of said first axis from said second valve and a valve plunger axially movable in the latter valve body and operatively engaging said floor plate so that said third valve is operated by rocking motion of said foot plate about said one axis;
means for supplying a second syringe fluid to the inlet of said third valve; and
a hose connected to the outlet of said third valve and adapted for connection to a second syringe inlet of the said handpiece; and
said second valve being opened to deliver its respective syringe fluid to the handpiece by lateral rocking motion of said foot plate in one direction about said one axis and said third valve being opened to deliver its respective syringe fluid to the handpiece upon lateral rocking motion of the foot plate in the opposite direction about said one axis.

3. A flow control unit comprising:
a base member;
an operating member overlying said base member;
one member including an upstanding fulcrum formation having a raised bearing surface bounded by opposing first fulcrum edges;
the other member including a second fulcrum edge normally seating against said bearing surface and extending transversely of said first fulcrum edges, whereby said operating member is selectively rockable about a first axis containing said second fulcrum edge by pivoting of the latter on said bearing surface and about an effective second axis transverse to said first axis and extending between and in symmetrical relation to said first fulcrum edges by pivoting of said second fulcrum edges about said first fulcrum edges;
a first valve mounted on one member along said first axis, in offset relation to said second axis, and coacting between said members in such manner that said valve is operated by rocking motion of said operating member about said second axis;

a second valve mounted on one member along said second axis, in offset relation to said first axis, and coacting between said members in such manner that said second valve is operated by the rocking motion of said operating member about said first axis; and means for retaining said bearing surface and second fulcrum edge in operative engagement.

4. A flow control unit comprising:

a base member including an upstanding fulcrum formation having a bearing surface bounded by opposing first fulcrum edges;

an operating member overlying said base member and including a second fulcrum edge normally seating against said bearing surface and extending transversely of said first fulcrum edges, whereby said operating member is selectively rockable about a first axis containing said second fulcrum edge by pivoting of the latter on said bearing surface and about an effective second axis transverse to said first axis and extending between and in symmetrical relationship to said first fulcrum edges by pivoting of said second edge about said first edges;

a first valve including an upstanding value body fixed to said operating member along said first axis in offset relation to said second axis and a valve plunger axially movable in said valve body and operatively engaging said base member, whereby said valve is operated by rocking motion of said operating member about said second axis;

a second valve including an upstanding valve body fixed to said operating member approximately along said second axis and in offset relation to said first axis, and a valve plunger axially movable in the latter body and operatively engaging said base member, whereby said second valve is operated by rocking motion of said operating member about said first axis;

said operation member being rockable about both of said axes to simultaneously operate both of said valves; and means acting between said members for retaining said bearing surface and second fulcrum edge in operative engagement and urging said operating member to a normal position relative to said base member.

5. A dental air drive comprising:

a floor plate having a raised bearing surface bounded by opposed first fulcrum edges which extend in a generally fore-and-aft direction of the plate;

a foot plate overlying said floor plate and including a second fulcrum edge seating against said bearing surface and extending transversely of said first fulcrum edges, whereby said foot plate is selectively rockable about a first axis containing said second edge by pivoting of the latter on said bearing surface and about an effective second axis transverse to said first axis and extending between and in symmetrical relation to said first fulcrum edges by pivoting of said second edge about said first edges;

springs acting between said plates for urging said foot plate to a normal position relative to said floor plate;

an air control valve including an upstanding valve body fixed to said foot plate along said second axis and in rearwardly offset relation to said first axis, and a valve plunger axially movable in said valve body and rockably secured at its lower end to said floor plate;

a pair of syringe valves along said first axis at opposite sides of said second axis and each including an upstanding valve body fixed to said foot plate and a valve plunger movable in the latter body and operatively engaging said floor plate;

means for supplying air under pressure to the inlet of said air valve and the inlet of one syringe valve;

means for supplying water under pressure to the inlet of the other syringe valve; and hoses coupled to the outlets of said valves, respectively, and adapted for connection to the turbine air inlet, syringe air inlet, and syringe water inlet, respectively, of a dental handpiece, whereby said first-mentioned air valve may be selectively opened to supply operating air to said handpiece by depressing said foot plate at a position substantially along said second axis and said syringe valves may be selectively opened to supply syringe air or syringe water to said handpiece by selectively depressing said foot plate at positions substantially along said first axis, and said first-mentioned air valve and either syringe valve may be opened simultaneously by depressing the foot plate between said positions.

6. A dental air drive comprising:

a rectangular floor plate having front and side edges and including an upstanding fulcrum formation having a raised anterior bearing surface bounded by opposing first edges extending generally in a fore-and-aft direction of the plate and a raised posterior edge disposed in the plane of and on the center line of said bearing surface, said edges forming first fulcrum edges;

a rectangular foot plate overlying said floor plate and having front and side edges parallel to the front and side edges, respectively, of the floor plate;

a valve carried by said foot plate including an upstanding valve body located along the fore-and-aft center line of the plate, a lower flanged valve stem bearing extending through an opening in said foot plate and threaded in the lower end of said valve body for securing the latter in upstanding position on said foot plate, and a valve plunger movable in said body including a stem slidably guided in said bearing;

the flange of said bearing having a lower, forward fulcrum edge extending normal to said center line of the foot plate and pivotally engaging said bearing surface to support said foot plate on said base plate for rocking about a first axis normal to said center line and located forwardly of the longitudinal axis of said valve;

said foot plate being rockable about an effective second axis extending normal to said first axis by pivoting of said second fulcrum edge about said first fulcrum edges;

springs acting between said plates for urging said foot plate to a normal position relative to said floor plate;

means rockably connecting the lower end of the valve stem of said valve to said floor plate so that rocking of said foot plate from said normal position thereof about said first axis opens said valve;

a pair of syringe valves carried by said foot plate at opposite sides of said second axis, each syringe valve including an upstanding valve body fixed to said foot plate approximately along said first axis, and a valve plunger operatively engaging said floor plate, whereby rocking motion of said foot plate about said second axis in one direction opens one of said syringe valves and in the opposite direction opens the other syringe valve;

a water tank mounted on said foot plate forwardly of said first axis;

means for supplying air under pressure to the inlet of said first valve, the inlet of one syringe valve, and to said water tank;

means connecting said tank below the normal water level therein to the inlet of the other syringe valve; and hoses connected to the outlets of said valves, respectively, and adapted for connection to the turbine air inlet, syringe air inlet, and syringe water inlet of a dental handpiece, whereby said valves may be selectively opened to deliver operating air, syringe air, and syringe water to said handpiece by selectively depressing the front and side edges of said foot plate.

7. A dental air drive according to claim 6, wherein:
the upper surface of said fulcrum formation slopes downwardly, away from the under surface of said bearing flange, toward the rear of said floor plate, whereby rotation of said foot plate in response to lessening of the weight of said tank as the water therein is consumed is ineffective to open said first air valve.

References Cited

UNITED STATES PATENTS

| | | | |
|---|---|---|---|
| 2,293,409 | 8/1942 | Smith | 74—478 X |
| 3,216,442 | 11/1965 | Roth | 137—209 |
| 2,958,233 | 11/1960 | Johnson | 251—297 X |

ALAN COHAN, Primary Examiner.

UNITED STATES PATENT OFFICE
CERTIFICATE OF CORRECTION

Patent No. 3,414,000                          December 3, 1968

William E. Newton

It is certified that error appears in the above identified patent and that said Letters Patent are hereby corrected as shown below:

Column 1, line 58, "utrbine" should read -- turbine --. Column 2, line 5, "ensuring" should read -- ensuing --. Column 3, line 67, "beaming" should read -- bearing --. Column 4, line 36, "upper" should read -- under --. Column 7, line 10, "at" should read -- as --; line 32, after "and" insert a comma. Column 8, line 42, "form" should read -- from --. Column 10, line 7, "openings" should read -- opening --; line 9, "the air" should read -- that air --; line 64, before "air" insert -- the --. Column 11, line 51, after "present" insert -- dental --. Column 13, line 41, "operation" should read -- operating --.

(SEAL)           Signed and sealed this 10th day of March 1970.

Attest:

Edward M. Fletcher, Jr.                  WILLIAM E. SCHUYLER, JR.

Attesting Officer                             Commissioner of Patents